Sept. 6, 1932.  J. B. WEBB ET AL  1,875,966
SWITCH MECHANISM FOR CONVEYER SYSTEMS
Original Filed March 18, 1930  2 Sheets-Sheet 1

Jervis B. Webb *INVENTORS*
Duane A. Blair  *and*
BY
Charles R. Halbert
ATTORNEY.

Sept. 6, 1932.  J. B. WEBB ET AL  1,875,966
SWITCH MECHANISM FOR CONVEYER SYSTEMS
Original Filed March 18, 1930   2 Sheets-Sheet 2
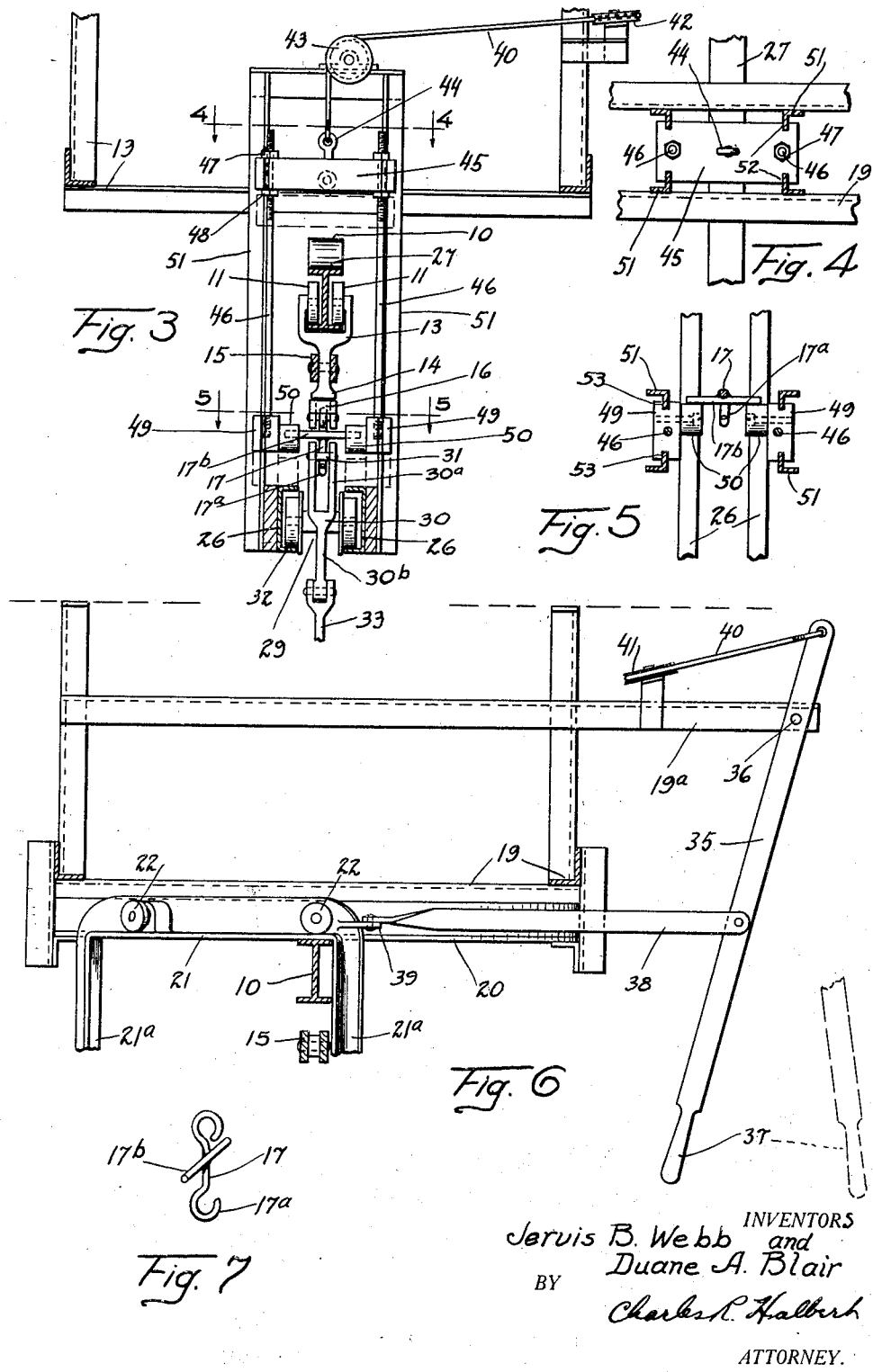
INVENTORS
Jervis B. Webb and
Duane A. Blair
BY
Charles R. Halbert
ATTORNEY.

Patented Sept. 6, 1932

1,875,966

UNITED STATES PATENT OFFICE

JERVIS B. WEBB, OF ROYAL OAK, AND DUANE A. BLAIR, OF DETROIT, MICHIGAN

SWITCH MECHANISM FOR CONVEYER SYSTEMS

Application filed March 18, 1930, Serial No. 436,867. Renewed April 21, 1932.

This invention relates to conveyer systems of the type commonly used for modern production methods of manufacturing wherein an endless conveyer chain travels about a manufacturing plant to transport articles from one part of the plant to another, during which transportation the articles may have various manufacturing operations performed upon them by workmen stationed at various points along the conveyer's line of travel.

Conveyer systems of this type have proven highly successful in practice not only because the amount of manual handling of the articles is reduced to a minimum, but also because the use of such systems enables the manufacturer to maintain a steady even flow of work in process from one operation to another and as a result the entire rate of production is controlled and maintained by the speed of the conveyer which acts as a pacemaker, each workman or group of workmen stationed along the conveyer being required to complete a particular operation during the time the conveyer is travelling past a station. It is therefore highly important to maintain the conveyer system operating at its selected speed and to avoid any stoppages or changes in speed of the system.

The present invention relates to means for permitting this desirable result to be attained, and more specifically to conveyer systems of the type disclosed in the co-pending application for Letters Patent of the United States, Serial No. 392104, filed September 12, 1929, by Jervis B. Webb and Duane A. Blair, and which include, in addition to the main conveyer, one or more auxiliary tracks having entrance and delivery ends adjacent to the main conveyer's line of travel, combined with a manually operable switch by means of which each end of each auxiliary track may be placed in communication with the main conveyer.

One of the principal objects of the present invention is to provide a new and improved construction by means of which the articles, or the devices upon which they are supported, are automatically released from the main conveyer and delivered to a side or auxiliary track.

Another object is to associate with the manually operable switches, above referred to, means for automatically releasing the articles from the main conveyer when the take-off switch is thrown to a position in operative alignment or association with the main conveyer.

The above and other objects of the invention will appear more fully from the following more detailed description and by reference to the accompanying drawings forming a part hereof, wherein Fig. 1 is a side elevation, partly in section, of a section of a conveyer system constructed in accordance with the principles of the present invention.

Fig. 2 is a plan view, also partly in section of the structure shown in Fig. 1.

Fig. 3 is a section on the line 3—3 of Fig. 2.

Figs. 4 and 5 are sections taken on the line 4—4 and 5—5 respectively of Fig. 3.

Fig. 6 is a sectional detail taken approximately on the line 6—6 of Fig. 1, the right hand track section being omitted.

Fig. 7 is a perspective detail of one of the conveyer hooks of the main conveyer.

As shown in the drawings, the main conveyer comprises a load supporting track indicated generally by the reference character 10. This track may be of any suitable or desirable construction. As shown it is in the form of an I beam, the lower horizontal flanges of which form tracks upon which the rollers 11 of the main conveyer trolleys 12 are supported. Each of said trolleys, in the constructional example shown, includes four rollers 11 arranged in two pairs, one pair co-operating with the lower flange of the I beam 10 on one side thereof and the other pair co-operating with the lower flange on the other side of said I beam. The rollers 11 of each trolley 12, as shown most clearly in Fig. 3, are carried by a pair of yoke-shaped brackets 13 each having a depending arm 14 which passes through, and is associated in driving relationship with, a continuous or endless conveyer chain 15. The chain 15 is driven by any suitable driving mechanism (not shown). Secured to the lower ends of the depending arms 14 of the yokes 13 is a cross bar 16, which, at a point intermediate its ends, and preferably centrally thereof, has pivotally secured to it a hook 17.

At any suitable or desirable places along the line of travel of the main conveyer, auxiliary or side tracks 18 are provided, the ends of which are formed of a pair of laterally spaced track members, and terminate adjacent to the main conveyer. For the purpose of shunting articles from the main conveyer to the auxiliary tracks, a switch mechanism, such as disclosed in the copending application hereinbefore mentioned, is provided.

This switch mechanism, as shown most clearly in Figs. 1 and 2 of the drawings, is carried by a rectangular supporting frame indicated generally by the reference character 19. Mounted upon the frame 19 is a pair of curved transversely extending spaced tracks 20. These tracks are preferably constructed of angle irons, having their ends suitably secured to the rectangular frame 19, and so that one leg of each iron forms a horizontal trackway. Mounted upon the horizontal trackways formed by the angle irons 20, is a carriage 21 provided with a plurality of rollers 22 which rest upon the transverse tracks 20. The carriage 21 has a depending yoke-like portion 21a, the lower ends of which serve to support the ends of a pair of switch track sections 23 laterally spaced from each other at the same distance as the members of the auxiliary track 18. The other ends of the switch tracks 23 are pivotally secured, by the pivot bolts 24, to a supporting bracket 25 carried by the rectangular frame 19. The pivoted ends of the tracks 23 are arranged in alignment with a pair of take-off track sections 26, said sections 26 also being suitably supported from the supporting frame 19.

As clearly shown in Fig. 1 of the drawings, the main conveyer, load carrying track 10 is depressed or bent downwardly as indicated by the numeral 27, for a section of its length below the frame 19 for a purpose which will presently appear. It will be noted by referring to Fig. 1 of the drawings, that the ends of the take-off track sections 26 project at their left hand ends beyond the rectangular frame 19 and beyond the depression 27 of the main track 10, and are provided with the flared terminals 28.

Each trolley 12 of the main conveyer is adapted to have supported upon its hook 17, a load carrying trolley 29. Each load carrying trolley consists of a bracket 30 having a yoke 30a at its upper end, through the arms of which yoke a pin 31 extends. The pin 31 is adapted to be engaged by and supported upon, the hooked end 17a of the hook 17 hereinbefore referred to. Rotatably mounted on each bracket 30 is a plurality of traction wheels or rollers 32, four of such wheels being shown in the drawings, arranged in spaced pairs on each side of said bracket 30. The bracket 30 also includes a depending portion 30b, to which is pivotally secured any suitable article carrying device such as the double hook 33. The traction wheels 32 of the brackets 30 are adapted to engage with the take-off track sections 26, said track sections being disposed at a distance below the main conveyer track 10 such that said wheels 32 will enter readily into the flared terminals or entrance ends 28 of the take-off track sections 26 as indicated in Fig. 1 of the drawings.

The depression 27 of the main track is so positioned, relatively to the take-off track sections 26, that after the rollers 32 of the load carrying trucks 29 have passed into the take-off truck sections 26, the weight of the article supported upon the hooks 33 is transferred from the main track 10 to the take-off track section 26. The extent of the depression 27 is such that, as clearly shown in Fig. 1, the hooked end 17a of the hook 17 passes below the pin 31 to an extent sufficient to permit the disengagement of the hook 17 from the trolley 29.

In the operation of a system such as herein disclosed there will be times when it is desired to have the articles, carried on the main conveyer track 10, pass freely by the auxiliary track section 18, without being diverted or shunted off onto such auxiliary section, while at other times it may be desired to divert one or more of the articles from the main conveyer to the auxiliary section. The switch track section 23 hereinbefore described furnishes a means for accomplishing the above ends. In addition to the take-off track section 26, the frame 19 also supports a pair of end track sections 34. These end track sections 34, as clearly shown in Fig. 2 of the drawings, are in longitudinal alignment with the track sections 26. When it is desired to have the articles, carried by the main conveyer, pass along said conveyer without being diverted to the auxiliary track section, those ends of the switch track sections 23 which are supported by the carriage 21 are positioned in alignment with the end track sections 34 so that the take-off sections 26, the switch sections 23 and the end sections 34 form a continuous track member. When, however, it is desired to divert the articles from the main conveyer to the auxiliary track 18, the carriage 21 is actuated to move the switch track sections 23 upon their pivots 24, to a position inclined to the main conveyer, and, as shown in Fig. 2, with the right hand ends of the switch track sections 23 in alignment with the ends of the auxiliary tracks 18.

The means for actuating the switch track sections 23 to the positions above described consists of a manually operated lever 35, pivotally supported, as at 36, to a lateral extension 19a of the frame member 19. The lower end of the lever 35 is preferably formed with a hand grip portion 37 and said lever has secured to it, at a point intermediate to pivot 36 and the grip 37, one end of a link 38. The other end of the link 38 is connected to an ear or lug 39, preferably formed integrally with, and projecting laterally from, the carriage 21, as shown in Fig. 6. In this figure the carriage 21 is shown in a position corresponding to that shown in Fig. 2, in which the switch track sections 23 are thrown into operative relationship with the auxiliary track 18 so as to divert the articles from the main conveyer to the auxiliary track.

Means are provided to insure that the article carrying trolleys 29 will be disengaged from the main conveyer trolleys 12 when the switch track sections 23 are in the position shown in Fig. 2. This means comprises a device for insuring the disengagement of the hooked lower ends 17a of the hooks 17 from the pins 31 of the article carrying trolleys 29. As clearly shown in Fig. 7 of the drawings, each hook 17 has secured to, or formed integrally with, it a cross bar 17b. The ends of each cross bar 17b project laterally some distance to each side of its respective hook 17. Secured to the upper end of the lever 35 is one end of a cable 40, which cable is trained about a plurality of idler pulleys 41, 42 and 43 and has its other end secured to a hook 44, secured in a cross bar 45. A pair of bolts 46 extend at their upper ends through suitable apertures in the bar 45, and are adjustable vertically relative to said bar by means of the nuts 47 and 48, screw threaded onto said bolts for engagement with the upper and lower faces respectively of said bar. At their lower ends, the bolts 46 are screwed into a pair of side blocks 49. Each block 49 has secured to it a roller 50 which projects laterally from the block sufficiently far to engage the ends of the pin 17b. The cross bar 45, the bolts 46, block 49, and rollers 50 form a vertically movable carriage which is guided for such vertical movement by means of a plurality of guideways 51. These guideways 51 are preferably formed of angle iron and have their upper and lower ends suitably secured to the frame 19 and the take-off sections 26 respectively. As shown in Figs. 4 and 5 of the drawings, the guideways 51 are arranged in pairs, one pair on each side of the vertically movable carriage just described. The cross bar 45, as shown in Fig. 4 and the blocks 49, as shown in Fig. 5 are provided on their opposite faces with grooves 52, 53, respectively, into which the guideways 51 project, it being understood that the grooves 52, 53, are so proportioned as to permit free sliding movement of the vertically movable carriage along said guideways.

The manner in which the device operates is as follows:

Let it be assumed that it is desired to divert one or more of the article carrying trolleys 29 from the main conveyer to the auxiliary track 18. An operator stationed at the auxiliary track section 18 will actuate the lever 35 to cause the carriage 21 to be moved to the position shown in full lines in Fig. 2 of the drawings, in which position the right hand ends of the track sections 23 are in alignment with the ends of the auxiliary track section 18. This movement of the lever 35 is communicated, through the cable 40 and hook 44, to the cross bar 45, causing the vertically movable carriage, consisting of said cross bar, the bolts 46 and the blocks 49, to be moved to a position, such as shown in full lines in Figs. 1 and 3 and in which position the rollers 50 will be located in the path of movement of the ends of the cross bar 17b of the hook 17. By referring to Fig. 1 of the drawings, it will be noted that the vertically movable carriage is secured to the frame 19 and take-off track sections 26 at a point where the depression 27 of the main conveyer track 10 has its greatest depth. Assuming the main conveyer to be moving in the direction of the arrow Fig. 1, it will be readily understood that as the rollers 32 of each article carrying trolly 29 reach the flared end 28 of the take-off track sections 26, said rollers will pass readily into said take-off track sections. As the movement of the main conveyer continues, the rollers 11 of the main conveyer trolleys 12 will pass onto the downwardly inclined portions of the depression 27, and, by the time the trolley has reached the greatest depth of the depression 27 and the point where the vertically movable carriage is located, the weight of the article carried by the truck 29 will be supported entirely by the take-off track sections 26. The depression 27 has sufficient depth to insure that the hooked lower end of the hook 17 will have been moved downwardly a sufficient distance to permit such hook to be disengaged from the pin 31. Assuming the blocks 50 to be in the position shown in full lines in Fig. 3, the ends of the bar 17b will engage the rollers 50 of the vertically movable carriage and, due to the movement of the main conveyer from left to right, the hook 17 will be swung in a clockwise direction (Fig. 1) and clear of the pin 31. The conveyer continuing its movement, the ends of the bar 17b will ride over the tops of rollers 50, thereby causing the hooked end of the hook to be elevated a sufficient distance so that, as the main conveyer continues its movement, the hook 17 will pass over or above the pin 31 thereby leaving the trolley 29 upon the take-off track section 26; it being understood that the hook 17 will not again return to a vertical position until after it has travelled some distance beyond the point of its disengagement from the trolley 29. The trolley 29, with whatever article or articles carried thereby, is then pushed manually by the operator onto the switch track sections 23 to be conveyed thereby to the auxiliary track section 18 all as will be readily understood. It will also be understood, however, that the take-off track sections, the switch track section, and the auxiliary track 18 may be inclined downwardly to cause the trolleys 29 to roll onto the auxiliary tracks without any manual effort being exerted thereon.

If it is desired to have the articles pass along the main conveyer without being diverted onto the auxiliary track section 18, the lever 35 will be swung from the full line to the dotted line position indicated in Fig. 6, thereby moving the track sections 23 to the dotted line position shown in Fig. 2. With the lever 35 in this latter position the vertically movable carriage will be in the position indicated in dotted lines in Fig. 3, in which position it will be noted that the rollers 50 are located below the path of travel of the ends of the bar 17b and consequently the hook 17 will not be swung out of engagement with the pin 31. As there will be no engagement of the bar 17b by the rollers 50 when the track sections 23 are in alignment with the main conveyer track 10, and the end section 34, the lowering of the hook 17, as the main conveyer trolleys pass along depression 27, will not result in the disengagement of the hooks from the article carrying trolleys 29, but as the main conveyer trolleys move upwardly along the inclined right hand end of the depression 27, the hooked lower ends 17a of the hooks will again move into operative engagement with pins 31.

It will be readily understood from the foregoing description and by reference to the drawings that the present invention provides a means whereby the weight of the articles carried by the main conveyer is transferred automatically from the load carrying track 10 of the main conveyer to the take-off track section 34 when the trolleys 10 pass onto the section of the main track having the depression 27 therein, and that when the lever 35 is in its set position which corresponds to the position of the switch track in which the latter communicates with the auxiliary track 18, the rollers 50 will lie in the path of movement of the bars 17b of the hooks 17 so that the latter will be automatically disengaged from the article carrying trolleys 29 during the interval in which the main trolleys 12 are travelling along the depressed track section 27. It will thus be seen that whenever the operator throws the switch track to the position shown in Figs. 2 and 6 the article carrying trolleys will be automatically released from the main conveyer trolleys.

It will furthermore be understood that with the present invention it is not necessary to disturb the speed of travel of the main conveyer, but that the articles may be shunted onto one or more auxiliary tracks for any processing operations which require a greater length of time for their completion than could be readily performed while the articles are transported by the main conveyer, also that if found desirable the invention may be employed for shunting the articles off onto storage tracks.

While but a single auxiliary track has been shown in the drawings it will be obvious that any desired number of such tracks may be utilized; that while the means for connecting the main and article carrying trolleys have been shown and described as hooks any suitable or equivalent readily disengageable devices may be employed; that while the means for disengaging said hooks has been disclosed as a vertically movable carriage connected to the lever 35 obviously many different or equivalent means could be substituted for performing the same functions. Likewise many other changes, variations and modifications from the particular constructional example selected for illustrating the principles of the invention may be resorted to without departing from such principles.

We claim:

1. In a conveyer system, a main continuously operating conveyer, an auxiliary track adjacent to said main conveyer, switch means for placing said auxiliary track selectively into or out of communicating relationship with said main conveyer and means for automatically releasing article carrying devices from the main conveyer when said switch means is in communication with said auxiliary track.

2. In a conveyer system, a main continuously operating conveyer, a take-off track located below said conveyer with the entrance end of said track at a predetermined distance below said main conveyer, and said main conveyer having a depressed portion located above said take-off track for transferring the load or weight of the article carrying devices from said main conveyer to said take-off track.

3. In a conveyer system, a main continuously operating conveyer, a take-off track located below said conveyer with the entrance end of said track at a predetermined distance below said main conveyer, and said main conveyer having a depressed portion located above said take-off track for transferring the load or weight of the article carrying devices from said main conveyer to said take-off track, and means for automatically releasing the article carrying devices from the main conveyer when the load thereof is transferred to said take-off track.

4. A conveyer system of the type wherein a main continuously operating conveyer line has associated with it one or more auxiliary track sections and each auxiliary track section has associated with it a switch for diverting articles carried by said main conveyer, characterized by the provision of a device operatively associated with said switch for causing the articles carried by said main conveyer to be released therefrom when said switch is in position to divert said articles to said auxiliary track.

5. A conveyer system of the type wherein a main continuously operating conveyer comprising a load supporting track and trolley thereon has associated with it an auxiliary track and a switch track is provided for selectively placing said auxiliary track into or out of communicating relationship with said main conveyer, characterized by the provision of a take-off track section adjacent to said switch track, an article carrying trolley, adapted to be carried by a trolley of the main conveyer, said take-off track section having a flared entrance end for directing the article carrying trolley readily onto said take-off track section.

6. A conveyer system of the type wherein a main continuously operating conveyer comprising a load supporting track and trolley thereon has associated with it an auxiliary track and a switch track is provided for selectively placing said auxiliary track into or out of communicating relationship with said main conveyer, characterized by the provision of a take-off track section adjacent to said switch tracks, a plurality of article carrying trolleys supported by the main conveyer trolleys, and said main conveyer track being provided with a depression adjacent to said take-off track section for transferring the weight of the articles being transported from said main track to said take off track.

7. A conveyer system as set forth in claim 6 in which the main conveyer trolleys are provided with disengageable means for supporting the article carrying trolleys, and means under manual control are provided adjacent to the depression of the main track for releasing the said disengageable means from the article carrying trolleys.

8. A conveyer system of the type wherein a main continuously operating conveyer comprising a load supporting track and a plurality of trolleys thereon has associated with it an auxiliary track and a switch track for selectively diverting articles from said main track to said auxiliary track, characterized by the provision of a plurality of article carrying trolleys carried by said main track trolley, a depressed section in said main track, a take-off track section located below said depressed section, disengageable devices for connecting said article carrying trolleys to said main track trolleys and means operatively associated with said switch track for automatically releasing said disengageable devices when said switch track is in position to divert the articles carried by said main conveyer to said auxiliary track.

9. In a conveyer system a main continuously operating conveyer, an auxiliary track adjacent to said main conveyer, a plurality of trolleys carried by said main conveyer, said trolleys having disengageable load supporting devices mounted thereon, a plurality of article carrying trolleys secured to the main conveyer trolleys by said devices, a switch track section for selectively placing said auxiliary track into or out of communcation with said main conveyer, and means operatively associated with said switch track section for movement into the path of travel of said devices to cause their release from said article carrying trolleys when said switch track section is in communication with said auxiliary track section.

10. In a conveyer system, a main continuously operating conveyer, an auxiliary track adjacent to said main conveyer, a plurality of trolleys carried by said main conveyer, said trolleys having disengageable load supporting devices mounted thereon, a plurality of article carrying trolleys secured to the main conveyer trolleys by said devices, a switch track section for selectively placing said auxiliary tracks into or out of communication with said main conveyer, a manually operable lever movable to two set positions, connections from said lever to said switch track section to cause said switch to be in communication with said auxiliary track in one set position of said lever and to be out of communication with said auxiliary track in the other set position of said lever, and means connected with said lever to extend into the path of movement of said devices in the said one set position of said lever and to be out of such path in said other position of said lever.

11. In a conveyer system, a main continuously operating conveyer comprising a load carrying track and a plurality of trolleys carried thereby, an auxiliary track adjacent to said main conveyer, a plurality of article carrying trolleys supported from said main conveyer trolleys, disengageable devices connecting said article carrying trolleys to said main track trolleys, a take-off track located below said main conveyer track, said main conveyer track including a depressed track section above said take-off track, a switch track pivotally associated with said take-off track for movement into and out of communication with said auxiliary track, and means operatively associated with said switch track automatically movable into the path of said disengageable devices to release said article carrying trolleys from said main track trolleys when said switch track is in communication with said auxiliary track and for holding said devices released during the travel of said main trolleys along the major portion of said depressed track section.

12. A conveyer system as set forth in claim 11 in which said disengageable devices are hooks pivotally connected to the main track trolleys, and said hooks are provided with lateral projections for engagement by the means for automatically releasing said disengageable devices.

13. A conveyer system as set forth in claim 11 in which the disengageable devices are hooks pivotally connected to the main conveyer trolleys, said hooks being provided with lateral projections and the means for disengaging said devices comprises a vertically movable carriage having laterally projecting rollers which, when said switch is in communication with said auxiliary track, are located in the path of movement of said lateral projections and which are out of the path of movement of said lateral projection when said switch is out of communication with said auxiliary track.

14. In a conveyer system, a main continuously operating conveyer comprising a load carrying track and a plurality of trolleys carried thereby, an auxiliary track adjacent to said main conveyer, a plurality of article carrying trolleys supported from said main conveyer trolleys, disengageable devices connecting said article carrying trolleys to said main track trolleys, a take-off track located below said main conveyer track, said main conveyer track including a depressed track section above said take-off track, a switch track pivotally associated with said take-off track for movement into and out of communication with said auxiliary track, a vertically movable carriage connected with said lever, said carriage having means projecting into the path of movement of said disengageable devices when said switch track is in communication with said auxiliary track and said means being out of the path of movement of said devices when said switch is out of communication with said auxiliary track.

In testimony whereof we affix our signatures hereto.

JERVIS B. WEBB.
DUANE A. BLAIR.